United States Patent [19]

Lee

[11] Patent Number: 5,560,476

[45] Date of Patent: Oct. 1, 1996

[54] NAME CARD CASE

[76] Inventor: Ming-Deh Lee, No. 62, Lane 94, Wen Lin N. Road., Pei Tuo, Taipei, Taiwan

[21] Appl. No.: 399,229

[22] Filed: Mar. 6, 1995

[51] Int. Cl.[6] .................................................. A45C 11/00
[52] U.S. Cl. .................. 206/38; 206/37; 206/485; 206/305; 364/708.1; 364/705.06
[58] Field of Search ........................ 206/38, 38.1, 37, 206/37.1, 37.4, 39, 39.3, 39.5, 39.7, 472, 576, 485, 320, 305; 364/708.1, 705.01, 705.06

[56] References Cited

U.S. PATENT DOCUMENTS

| | | | |
|---|---|---|---|
| 1,358,540 | 11/1920 | Goodwin | 206/37 |
| 2,667,199 | 1/1954 | Knee | 206/38 X |
| 3,369,585 | 2/1968 | Mortinsen | 206/37 |
| 4,075,702 | 2/1978 | Davies | 364/708.1 X |
| 4,224,675 | 9/1980 | Pinkerman | 364/708.1 X |
| 4,255,872 | 8/1981 | Williams, Sr. | 206/576 X |
| 4,421,127 | 12/1983 | Geer | 206/37 X |
| 4,719,338 | 1/1988 | Avery et al. | 364/705.06 X |
| 4,751,664 | 6/1988 | Holm | 364/708.1 |
| 4,754,418 | 6/1988 | Hara | 364/708.1 |
| 4,768,648 | 9/1988 | Glass | 364/708.1 X |
| 4,918,632 | 4/1990 | York | 364/708.1 |
| 4,939,514 | 7/1990 | Miyazaki | 364/708.1 |
| 5,126,725 | 6/1992 | Yanagisawa | 364/708.1 X |
| 5,209,598 | 5/1993 | Ros | 206/472 X |
| 5,272,319 | 12/1993 | Rey | 364/705.06 X |

*Primary Examiner*—Jacob K. Ackun
*Assistant Examiner*—Tara Laster
*Attorney, Agent, or Firm*—Bacon & Thomas

[57] ABSTRACT

An improved name card case includes a loose-leaf type partition disposed between the respective recesses of the first case cover and the second case cover. The partition has a trigger portion and a hook. The partition has a front action plate facing the first case cover. The front action plate is configured to have a shallow depression for receiving a main frame of the calculator. The first case cover is also provided with a notch, and the second case cover is provided with a supporting column and a curved guide portion. By means of the partition having the calculator thereon, the name card case is divided into two parts. The partition is also used to position the name cards in the first case cover. When the partition is pulled down, the calculator thereon may be used, and the name cards in the second case cover may be smoothly guided out of the case.

5 Claims, 5 Drawing Sheets

NAME CARD CASE

BACKGROUND OF THE INVENTION

The present invention relates to an improved portable name card case, and more particularly to a name card case with a calculator inside.

FIG. 1 is a perspective view of a conventional name card case. The name card case shown comprises a calculator case cover 1' and a name card case cover 2'. The calculator case cover 1' is fixedly connected to a calculator 4'. The name card case cover 2' has a chamber 21' for receiving name cards. Because this kind of conventional name card case has limited interior space and the calculator 4 also occupies space, there is only one chamber 21 for holding name cards besides, no partition is provided to classify the name cards of different groups, so that the name cards are all mixed up, which is very inconvenient.

If a partition is provided in such kind of conventional name card box, the addition of the partition will increase the thickness of the case or reduce the available interior space.

Furthermore, if a partition is provided to divide the interior space of the case into two separate chambers, operation of the calculator will become inconvenient.

SUMMARY OF THE INVENTION

It is therefore the primary object of the present invention to provide an improved name card case wherein a calculator and a partition are combined as a unit so that the interior space of the case may be divided into two separate chambers for holding different groups of name cards and, without increasing the thickness of the case.

Another object of the present invention is to provide an improved name card case, in which a pivotal partition provided with a calculator divides the interior space of the case into two chambers for receiving the name cards of the user and the name cards of other people thus enhancing use of the name card case.

A further object of the present invention is to provide an improved name card case, in which a partition disposed inside may be connected to a first case cover for positioning name cards held in a first recess between the partition and the case cover and securing a calculator, so that when the case is opened, the user may remove the name cards arranged in a second recess of a second case cover while the name cards in the first recess will be kept in position by the partition, and the partition may be disconnected from the first case cover for removal of name cards from the first recess.

Still another object of the present invention is to provide an improved name card case, in which a a curved guide portion is provided at a suitable position of a case cover for facilitating removal of the name cards contained therein.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
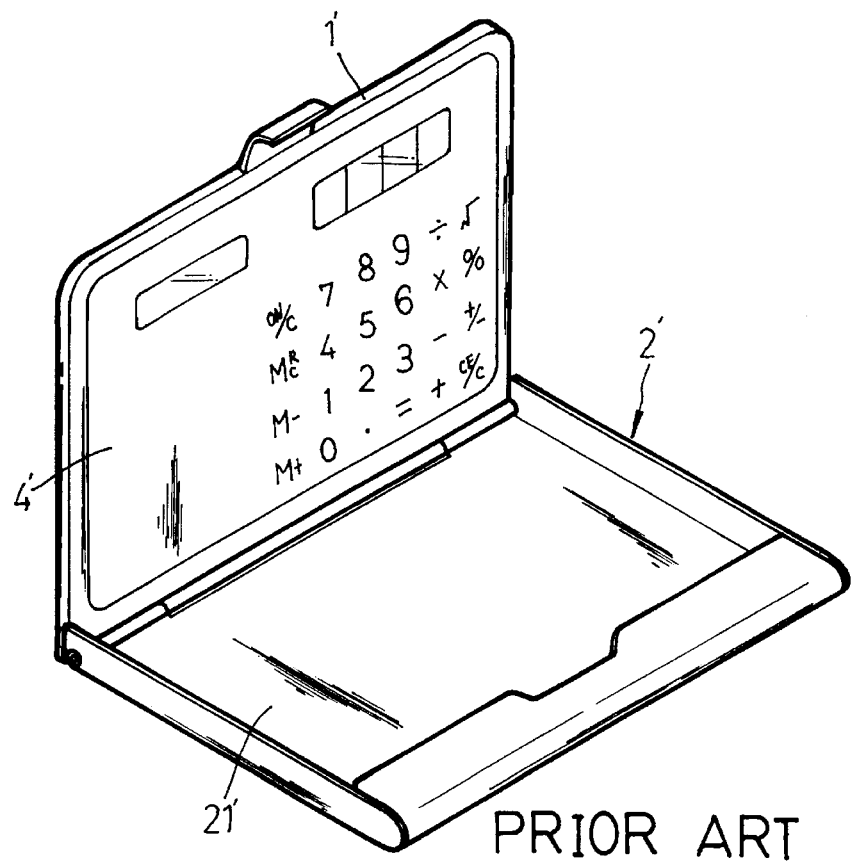
FIG. 1 is a perspective view of a conventional name card case.
Figure 2:
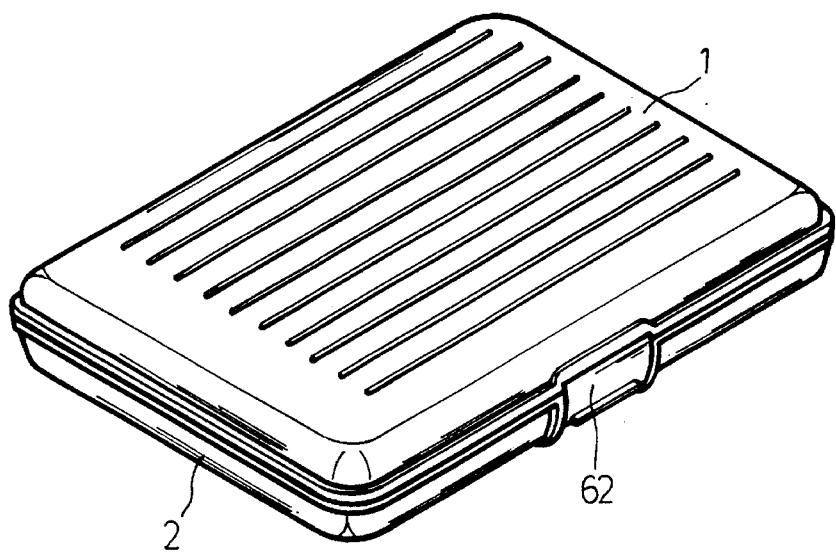
FIG. 2 is a perspective view of the preferred embodiment of the present invention.
Figure 3:
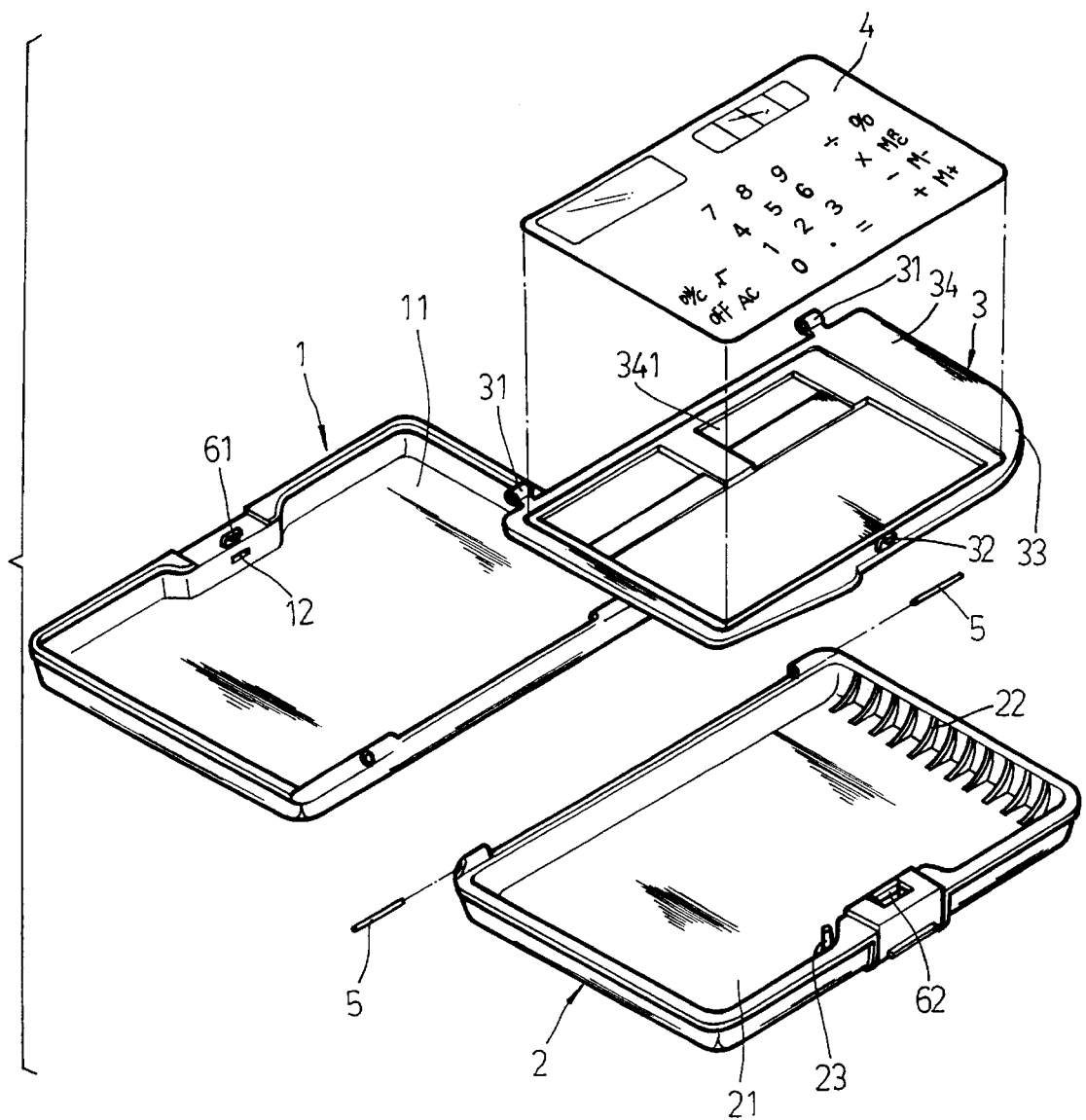
FIG. 3 is an exploded perspective view of the preferred embodiment of the present invention.

As shown in FIGS. 2 and 3, the name card case of the present invention comprises a first case cover 1, a second case cover 2, a partition 3 and a main frame 4 of a super-compact calculator. Pivot pins 5 disposed between the first case cover 1 and the second case 2 form hinges about which the first case cover 1 and the second cover 2 pivot to open or close the case. To close the covers, a male clasp element 61 and a female clasp element 62 are fastened together. The above-mentioned fundamental structure and the main frame 4 of the calculator belong to the prior art and hence will not be described in detail.

Figure 6:
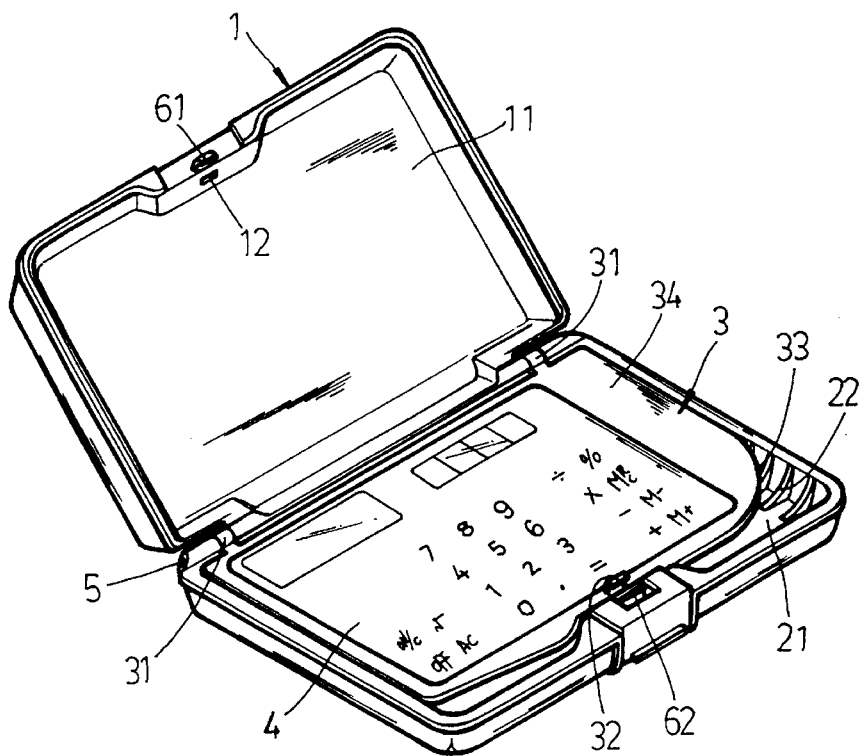
FIG. 6 is an perspective view of the present invention, showing the name card case of the present invention opened in a third state.

Referring to FIGS. 3 and 6, recesses 11, 21 are respectively provided in the first case cover 1 and the second case cover 2 for receiving name cards, and a partition 3 is pivotally mounted therebetween to divide the space of the case. To enable the partition 3 to be positioned or pivoted, two hinge elements 31 are provided at the bottom thereof, with holes for insertion of pivot pins 5 therethrough so that the hinge elements 31 may turn stably and freely.

Figure 4:
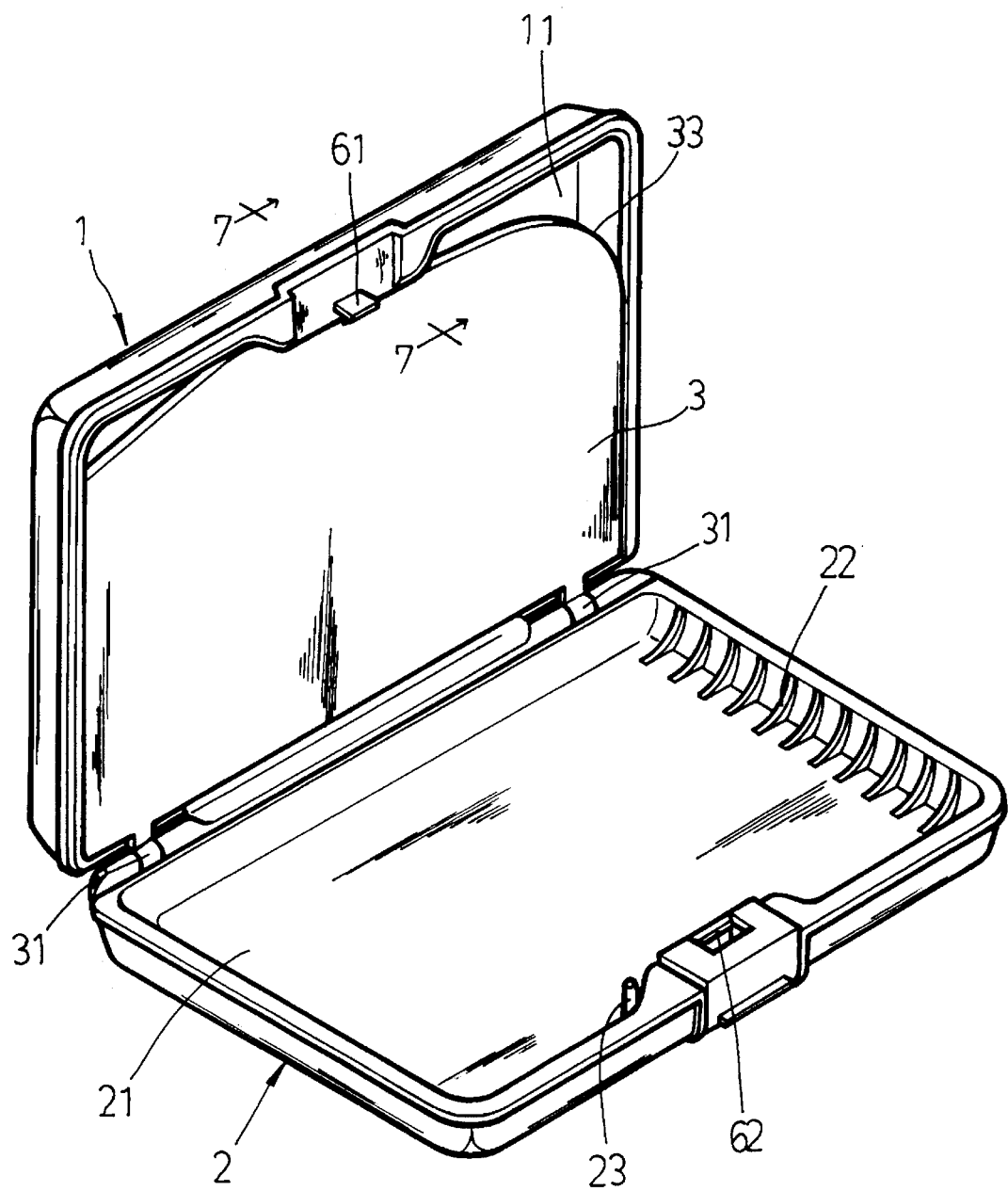
FIG. 4 is a perspective view of the present invention, showing the name card case of the present invention opened in a first state.
Figure 7:
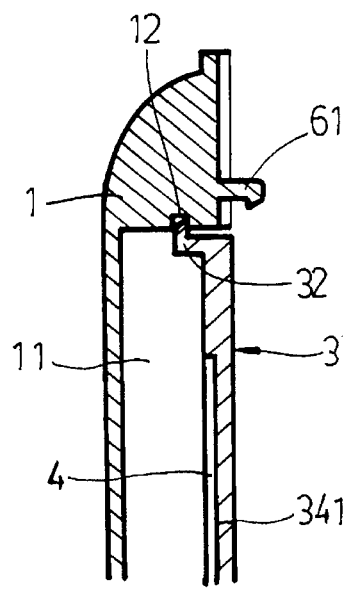
FIG. 7 is a cross-sectional view taken along line 7—7 of FIG. 4.

With reference to FIG. 7, a hook 32 is provided at the top of the partition 3, and a notch 12 is provided in the first cover at a corresponding position. Therefore, the hook 32 and the notch 12 may be fastened together and may be disconnected when the partition 3 is pulled down. Since the partition 3 may be fastened and positioned on the first case cover 1, name cards of other people may be placed in the recess 11 and positioned properly. As shown in FIG. 4, when the name card case is opened, name cards of the user may be placed in the recess 21 of the second case cover 2. At the same time, because the other people's name cards are placed in the recess 11 of the first case cover 1 and kept in place by the partition 3, they will not drop out or mix with the name cards of the user in the recess 21 of the second case cover 2.

Figure 5:
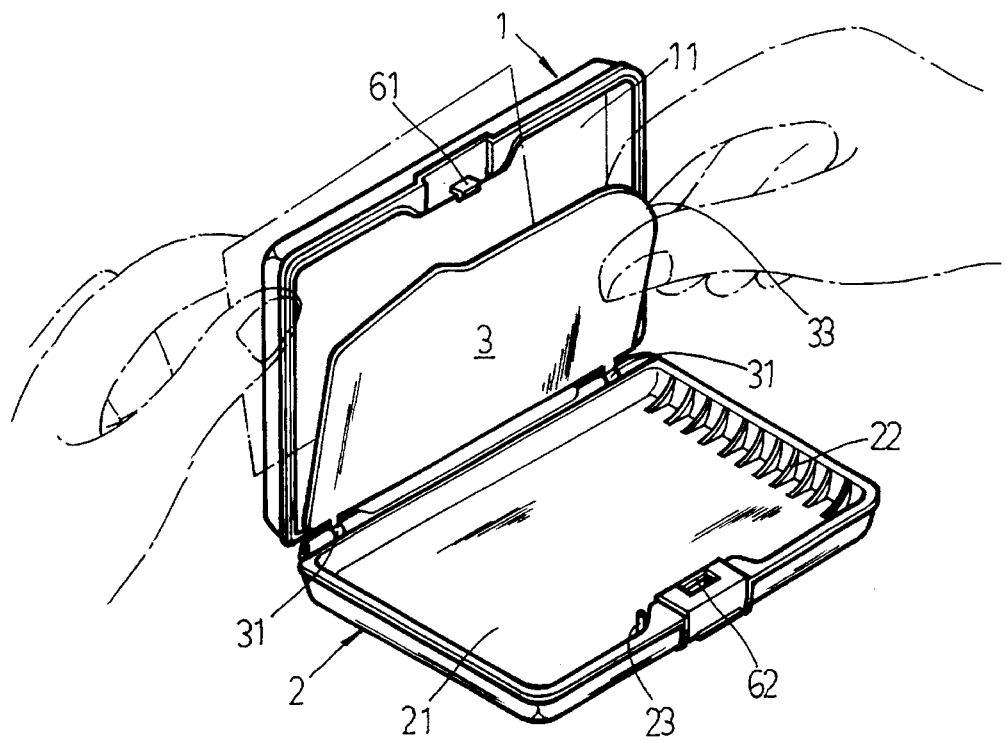
FIG. 5 is a perspective view of the present invention, showing the name card case of the present invention opened in a second state.

With reference to FIG. 5, in order to pull down the partition 3 easily, an upper corner of the partition 3 is provided with an inwardly recessed section forming a trigger portion 33, though which the user may insert a fingers to pull down the partition 3. Then the name cards of other people may be placed in the recess 11 of the first case cover 1.

Figure 8:
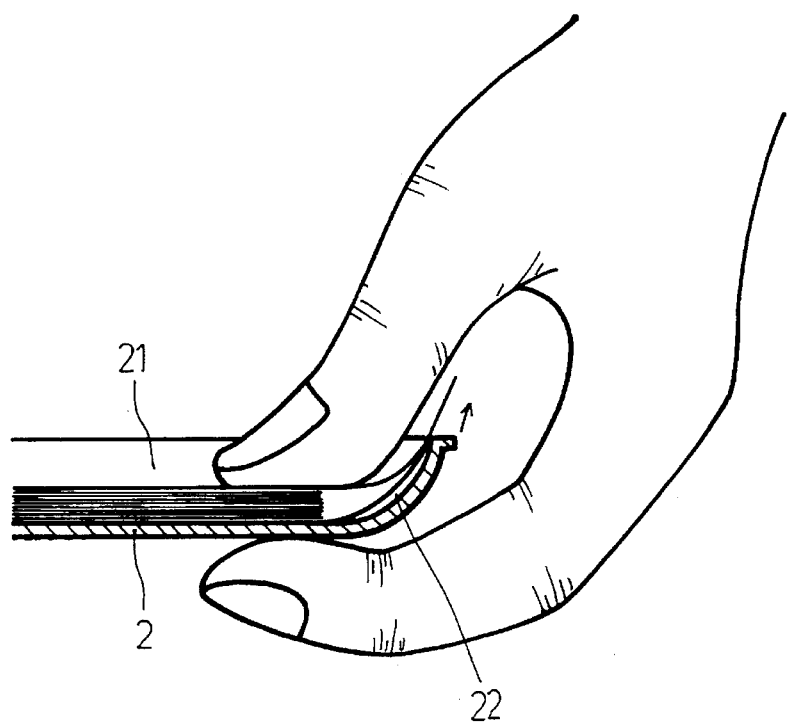
FIG. 8 is a cross-sectional view illustrating use of the second case cover of the present invention.

As shown in FIGS. 4 and 8, a curved guide portion 22 is provided at a lateral side of the recess 21 of the second case cover 2, so that the user may press his thumb against the upper side of each top name card contained therein and guide it along the curved guide portion, thus facilitating removal of namecards from the second case cover 2.

Referring to FIGS. 3 and 6, a front action plate 34 of the partition 3 has a shallow depression 341. The configuration of the depression 341 corresponds to that of a component at the rear side of the main frame 4 of the calculator. The main frame 4 may then be fitted into the depression 34 1, so that the calculator and the partition 3 may be assembled together as an integral unit in a very compact manner.

In ordinary super-compact calculators, a bottom plate is required. Therefore, arrangement of the partition 3 in the disclosed manner also permits it to used as a bottom plate for the main frame 4 of the calculator and not increase the thickness of the name card case. In addition, since the recess 11 of the first case cover 1 is no longer needed for receiving the calculator, it may be used to receive the name cards of other people.

Furthermore, a supporting column 23 is provided inside the second case cover 2 for the partition 3 to rest thereagainst when it is pulled down so that the partition 3 is in a horizontal position, thus facilitating operation of the calculator.

Although the present invention has been illustrated and described with reference to the preferred embodiment thereof, it should be understood that it is in no way limited to the details of such embodiment but is capable of numerous modifications within the scope of the appended claims.

What is claimed is:

1. In a card case of the type including a first case cover pivotally secured to a second case cover for defining a card storage space therebetween and a calculator disposed between the case covers, the improvement comprising:

a) the first and second case covers defining first and second chambers for separately storing cards therein;

b) a partition pivotally secured between the case covers for separating the first and second chambers, and the calculator being mounted to the partition;

c) means for detachably securing the partition to the first case cover for maintaining the cards stored in the first chamber and permitting access to the cards stored in the second chamber, the detachable securing means including a notch formed in the first case cover and a hook carried by the partition; and d) the partition including an inwardly recessed section for engagement by a finger of a user to attach and detach the notch and hook.

2. The card case of claim 1 wherein the second case cover includes a support engageable by the partition for positioning the calculator in a position of use.

3. The name card of claim 1 wherein the partition includes a depression configured for receiving a component of the calculator therein and permitting the partition and the calculator to be assembled as an integral unit.

4. The name card of claim 1 further including a pair of pins pivotally securing the first case cover, the second case cover and the partition together.

5. In a card case of the type including a first case cover pivotally secured to a second case cover for defining a card storage space therebetween and a calculator disposed between the case covers, the improvement comprising:

a) the first and second case covers defining first and second chambers for separately storing cards therein, the second case cover including a lateral side and a curved guide portion provided at the lateral side for facilitating the removal of cards from the second chamber by a user;

b) a partition pivotally secured between the case covers for separating the first and second chambers, and the calculator being mounted to the partition; and c) means for detachably securing the partition to the first case cover for maintaining the cards stored in the first chamber and permitting access to the cards stored in the second chamber.

* * * * *